(12) United States Patent
Yeo et al.

(10) Patent No.: US 8,358,322 B2
(45) Date of Patent: Jan. 22, 2013

(54) DISPLAY

(75) Inventors: Jong-Souk Yeo, Corvallis, OR (US);
Pavel Kornilovich, Corvallis, OR (US);
Peter Mardilovich, Corvallis, OR (US);
Jeffrey Todd Mabeck, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 567 days.

(21) Appl. No.: 12/609,707

(22) Filed: Oct. 30, 2009

(65) Prior Publication Data
US 2011/0102484 A1    May 5, 2011

(51) Int. Cl.
*G09G 5/10* (2006.01)
*G09G 3/34* (2006.01)
*G02B 26/00* (2006.01)

(52) U.S. Cl. .................... 345/691; 345/107; 359/296

(58) Field of Classification Search .................. 345/691, 345/107
See application file for complete search history.

(56) References Cited

U.S. PATENT DOCUMENTS

| | | | |
|---|---|---|---|
| 4,045,327 A * | 8/1977 | Noma et al. ................ 359/237 |
| 5,151,691 A | 9/1992 | Kuijk | |
| 5,680,182 A * | 10/1997 | Saito ............................ 349/41 |
| 6,130,774 A | 10/2000 | Albert et al. | |
| 6,741,385 B2 * | 5/2004 | Ikeda et al. ................... 359/296 |
| 6,781,745 B2 | 8/2004 | Chung et al. | |
| 6,822,783 B2 | 11/2004 | Matsuda et al. | |
| 7,110,063 B2 | 9/2006 | Takeda et al. | |
| 7,362,406 B2 | 4/2008 | Sikharulidze | |
| 7,399,989 B2 | 7/2008 | Moriya et al. | |
| 8,089,686 B2 * | 1/2012 | Addington et al. ............ 359/296 |
| 2002/0053320 A1 * | 5/2002 | Duthaler et al. .............. 118/249 |
| 2003/0011869 A1 * | 1/2003 | Matsuda et al. .............. 359/296 |
| 2006/0227097 A1 * | 10/2006 | Zhou et al. ..................... 345/107 |
| 2007/0046623 A1 | 3/2007 | Song | |
| 2008/0117165 A1 | 5/2008 | Machida et al. | |
| 2008/0227232 A1 | 9/2008 | Yamazaki et al. | |
| 2008/0284720 A1 | 11/2008 | Fukutome | |
| 2008/0284768 A1 | 11/2008 | Yoshida et al. | |
| 2008/0316410 A1 | 12/2008 | Fujii et al. | |
| 2010/0270588 A1 * | 10/2010 | Kosowsky et al. ............ 257/183 |

OTHER PUBLICATIONS

S. Blonkowski, M. Regache, A. Halimaoui; Non-linear dielectric properties of metal-amorphous-tantalum pentoxide-metal structures; Journal of Non-crystalline solids; 303 (2002) 108-113.*
Ma et al.,"Low Temp Crystal of High Permit Ta Oxide Using an Nb Oxide Thin Film for Metal/Insulator/Metal Cap in Dyn Rand Acc Mem Apps", J.Vac.Sci.Tech.B23(1), 2005, p. 80-83.
Zeng et al., "CVD of Tantalum Oxide Dielectric Thin Films for Nanoscale Device Applications", Journal of The Electrochemical Society, 151 (8) F172-F177 (2004).
Ezhilvalavan et al., "Conduction Mechanisms in Amorphous and Crystalline Ta2O5 Thin Films", Journal of Applied Physics, vol. 83, No. 9, May 1, 1998, pp. 4797-4801.

* cited by examiner

*Primary Examiner* — Alexander S Beck
*Assistant Examiner* — Mihir Rayan (57) ABSTRACT

A display includes a plurality of display elements. Each display element includes two opposed electrodes, a first dielectric layer, a fluid including a plurality of colorants, and a second dielectric layer. The first dielectric layer is disposed between the electrodes and has at least one reservoir defined therein. The second dielectric layer exhibits non-linear resistance, and is disposed on at least one of the electrodes and adjacent to the fluid. The fluid is disposed in a space defined between the electrodes, and the plurality of colorants is configured to move in response to an applied electric field.

21 Claims, 4 Drawing Sheets

BELOW THRESHOLD VALUE
Fig. 2A

ABOVE THRESHOLD VALUE
Fig. 2B

DISPLAY

BACKGROUND

The present disclosure relates generally to displays.

Electronic paper (also referred to as e-paper) is a form of display technology often designed to produce visible images that have a similar appearance to printed paper. Electrophoretic and electrokinetic displays are two examples of e-paper. An electrophoretic display generally uses electrophoresis to move charged particles in an electrophoretic medium under the influence of an external electric field. The charged particles may also be rearranged in response to changes in the applied electric field to produce visible images. An electrokinetic display generally uses electrokinetic phenomena, such as electrophoresis, electroconvection, electrochemistry, and/or combinations thereof, which may involve current flow as a switching mechanism in order to produce visible images.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

DETAILED DESCRIPTION

Embodiment(s) of the display, as disclosed herein, generally include at least one display element, each constructed with i) at least two opposed electrodes, ii) at least one electrically activatable fluid/medium disposed between the opposed electrodes, and iii) at least one dielectric layer exhibiting non-linear resistance disposed between the opposed electrodes. As used herein, the dielectric material exhibiting non-linear resistance is one whose resistance decreases with applied voltage. In the embodiments disclosed herein, the electrical current passing through a non-linear resistance dielectric exhibits threshold behavior where the current is essentially zero when the applied electric field is below a threshold value, and increases above this threshold value. As such, the non-linear resistance dielectric acts as a conductor at voltages exceeding the threshold, but acts as a charge-blocking device at voltages below the threshold. Since the threshold voltage is dictated by the current density, the display may be configured to exhibit any threshold value that corresponds with the current density of the selected material. The addition of the non-linear resistance dielectric material advantageously eliminates the "half select" problem where display elements having voltage applied thereto via either a select line or a data line change their optical state even though such elements should change their optical state upon receiving voltage from both a select line and a data line. More particularly, the dielectric layer provides a selective barrier for current flow, and thus introduces a threshold voltage value to the display element so that the display element changes its optical state when the applied electric potential is above the threshold, but does not change its optical state when the applied electric potential is below the threshold.

The addition of the non-linear resistance dielectric material also advantageously enables the grey scale to be controlled within each display element.

It is to be understood that embodiments of the display 10, 10' may be operated at current densities ranging from about $10^{-4}$ to about $10^{-9}$ A/cm$^2$.

The display elements disclosed herein may be particularly suitable for use in electrokinetic displays, where combinations of multiple electrokinetic phenomena, such as electrophoresis, electro-convection, and electrochemical interactions, lead to the control of electrically activatable media through charge transfer between the conductive electrodes and the medium. Such displays are discussed further hereinbelow in reference to the various Figures.

Figure 1A:
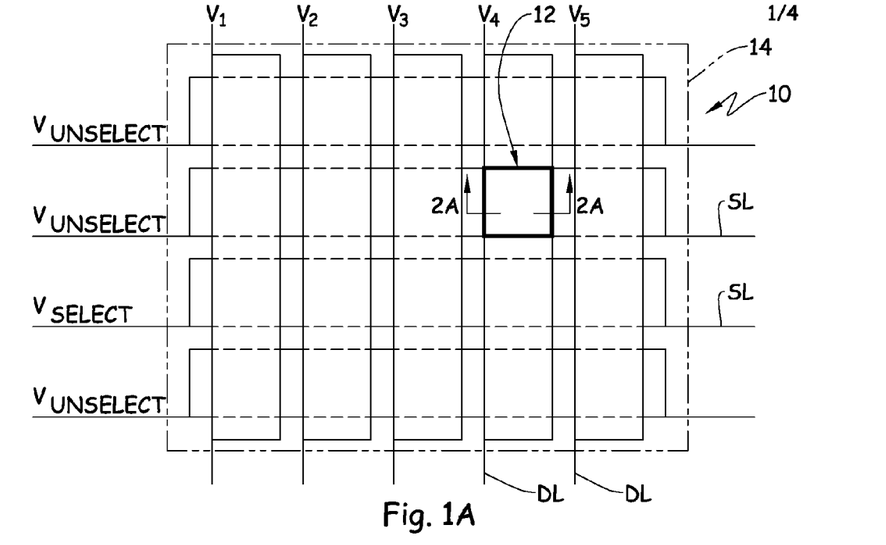
FIG. 1A schematically depicts an embodiment of a display including a passively addressed matrix of display elements.
Figure 1B:
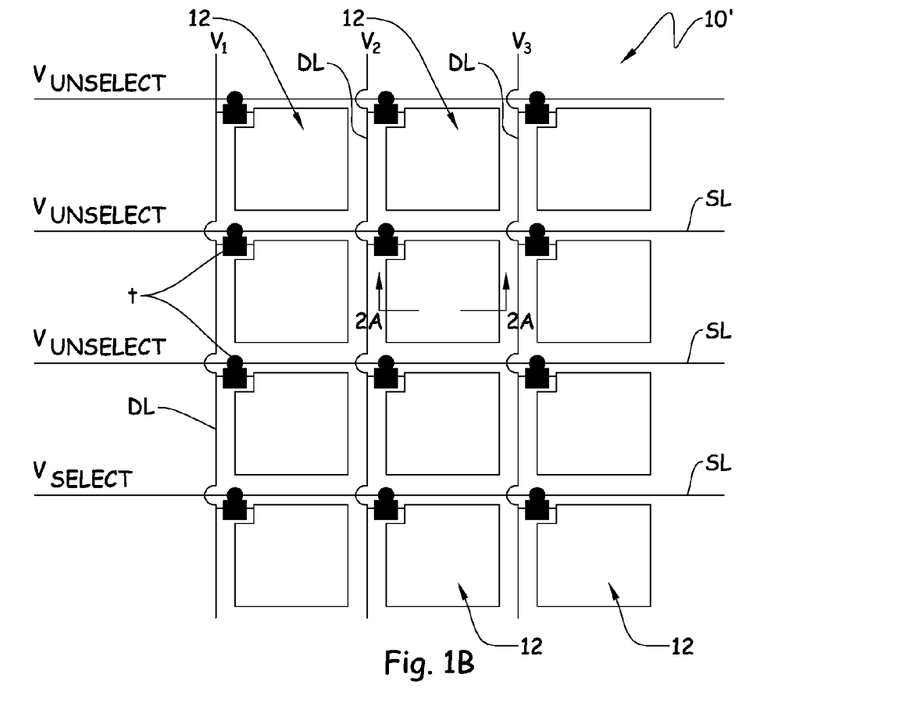
FIG. 1B schematically depicts an embodiment of a display including an actively addressed matrix of display elements.

Non-limiting examples of a display 10, 10' are schematically shown in FIGS. 1A and 1B. The display 10, 10' generally includes at least one display element 12 established on a surface of a substrate 14. As shown in FIGS. 1A and 1B, the display 10, 10', includes several display elements 12 arranged on the substrate 14 in a two-dimensional array, where the display elements 12 are disposed in straight lines to form a substantially square lattice. Other arrangements of the display elements 12 include, but are not limited to, arrangements in rectangular lattices, substantially triangular lattices, or stretched triangular lattices.

As also shown in FIGS. 1A and 1B, the display elements 12 are established on the substrate 14 in a single level. The display elements 12 may, in another embodiment, be stacked in two or more levels on the substrate 14. Such configuration of the stacking is referred to herein as "multi-level stacking". For instance, a multi-level stack including two layers of the display elements 12 may include a first series of the elements 12 established on one side of the substrate 14, and another series of elements 12 established on an opposing side of the substrate 14. Such multi-level stacking arrangements enable colored images to be produced by the display 10, 10'.

As also shown in FIGS. 1A and 1B, the display 10, 10' may include several individual display elements 12 arranged on the substrate 14 in rows and in columns. In other embodiments (not shown), the display elements 12 may be provided as individual segments (i.e., each element 12 is isolated from each other element 12 and each element 12 is a directly addressable component). In any event, each element 12 or segment of elements 12 is/are generally driven by at least two electrodes: an electrode placed along each select line SL; and an electrode placed along each data line DL. It is to be understood that although the electrode placed along the select line SL and the electrode placed along the data line DL technically cross at each of the display elements 12, the display element 12 architecture (which will be described in detail below) electrically isolates one electrode from another.

The display 10, 10' may also be configured to be driven via a number of different addressing schemes, including but not limited to passive matrix addressing (e.g., using the configuration shown in FIG. 1A) and active matrix addressing (e.g., using the configuration shown in FIG. 1B). The display 10 depicted in FIG. 1A is an example of a display that uses passive addressing to form visible images. During passive addressing, selected rows of the display elements 12 (one element 12 is labeled in the figure at one intersection of two electrodes, but it is to be understood that a display element/pixel 12 is formed at each intersection of the two electrodes) are written with optical states determined by an electric potential difference between select lines SL and data lines DL. Each display element 12 in non-selected rows generally maintains its state without active driving circuitry (e.g., transistors, etc.) until the row containing such display elements 12 is selected and the voltage applied is above the threshold value for the display element 12. The voltage applied to the element 12 is the difference between the data line DL potential, denoted in FIG. 1A as $V_1, V_2, V_3, V_4, V_5$, and the selected line potential denoted in FIG. 1A as $V_{select}$. Passive matrix addressing is often used in, but not limited to, liquid crystal displays, electronic papers, or the like.

The display 10' shown in FIG. 1B is an example of a display that uses active addressing to form visible images. The display 10' may be actively addressed by connecting each display element 12 to, e.g., a transistor "t" or other switching device and maintaining a state of one display element 12, while one or more other element(s) 12 is/are being addressed. The respective voltages are denoted in the figure as $V_{select}$, $V_{unselect}$, and $V_1, V_2$ and $V_3$. Active matrix addressing typically enables relatively fast display refresh times, as compared to passively addressed displays, since the refresh time depends, at least in part, on the speed of the transistor "t" rather than on the speed of an optical effect. Active addressing is often used in, but not limited to, video displays.

Another example of a display (not shown in FIG. 1A or 1B) may include one that is directly addressed. In direct addressing, each display element 12 is a segment individually driven by its own data line. Segmented display elements may have arbitrary shapes and may not be organized in a repeating array.

Figure 2A:
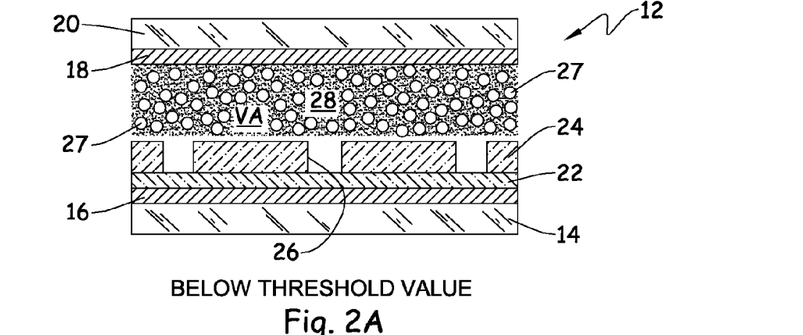
FIG. 2A is a cross-section taken along line 2A-2A of FIGS. 1A and 1B, which illustrates an embodiment of the display element (including a dielectric layer adjacent to a bottom electrode) when no voltage or a voltage below the threshold value is applied.
Figure 2B:
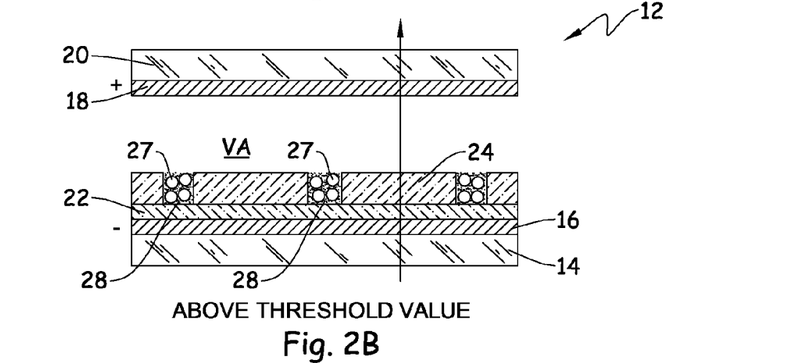
FIG. 2B illustrates the display element of FIG. 2A after the applied voltage is above the threshold value.

Referring now to FIGS. 2A and 2B, one embodiment of the display element 12 is depicted both when no voltage or a voltage below the threshold value is applied (FIG. 2A), and when a voltage above the threshold value is applied (FIG. 2B).

The display element 12 includes first and second opposed electrodes 16, 18 having a viewing area VA defined therebetween. Non-limiting examples of suitable materials for the electrodes 16, 18 include a metal (such as, e.g., gold, aluminum, nickel, copper, tantalum, etc.), a conductive oxide (such as, e.g., indium tin oxide, etc.), a conductive polymer (such as, e.g., PEDOT (poly(3,4-ethylenedioxythiophene), and/or the like), a conductive composite (such as, e.g., a layer of carbon nano-tubes, etc.), and/or combinations thereof. It is to be understood that depending upon how the display element 12 is to be addressed, the electrodes 16, 18 each may be pixel-size conductive plates (connected with driving circuitry by linear or non-linear electrical elements, wherein such plates contribute to a pixelated array of electrodes), essentially one-dimensional line electrodes (with the intersection of two crossing lines defining individual pixels as shown in FIG. 1A), or entire segments (i.e., essentially two dimensional conductive plates which are electrically isolated from each other and are addressed individually and independently of each other). An essentially one-dimensional line electrode has one dimension that is larger than another dimension (e.g., length is much greater than diameter). An essentially two-dimensional conductive plate has a cross-sectional area that is significant compared to the area of the display element 12.

In an embodiment, the display element 12 also includes at least the substrate 14, which supports one of the electrodes 16, 18. In another embodiment, as illustrated in both FIGS. 2A and 2B, the display element 12 includes two opposed substrates 14, 20, each of which supports a respective electrode 16, 18. The substrates 14, 18 may be selected from insulating materials, conducting materials, or semi-conducting materials. In an embodiment, the substrates 14, 18 are selected from an insulating material, non-limiting examples of which include glass, various polymers, and/or the combinations thereof. If a polymer is used, non-limiting examples of suitable polymers include polycarbonates (PC), polyarylates (PAR), polyimides (PI), polyethyleneterephthalate (PET), polyethylenenapthalate (PEN), polyestersulfone (PES), polyolefins, and/or combinations thereof.

The substrate 14 and/or the substrate 18 may also be selected from a material that is transparent, or from a material that is opaque. Such a selection may depend, at least in part, on how the visible image is produced. For example, if the display 10, 10' uses reflectivity to form visible images, the display 10, 10' requires light to pass through one of the substrates 14, 18, but the other of the substrate(s) 14, 18 may be selected from an opaque material. In some instances, the display 10, 10' may also be used on top of or over another display or another image. In such instances, the substrate(s) 14, 18 may be selected from transparent materials.

In still another embodiment (not shown), the substrate 14 may be formed from a conducting or a semiconducting material. In this embodiment, the display element 12 may be configured so that the substrate 14 functions as the electrode 16. In such a configuration, the display element 12 does not include a separate substrate 14. Non-limiting examples of suitable conducting materials for the substrate 14/electrode 16 include stainless steel, metallic foils, and/or the like. A non-limiting example of a suitable semiconducting material for the substrate 12/electrode 16 includes a silicon wafer.

Figure 3:
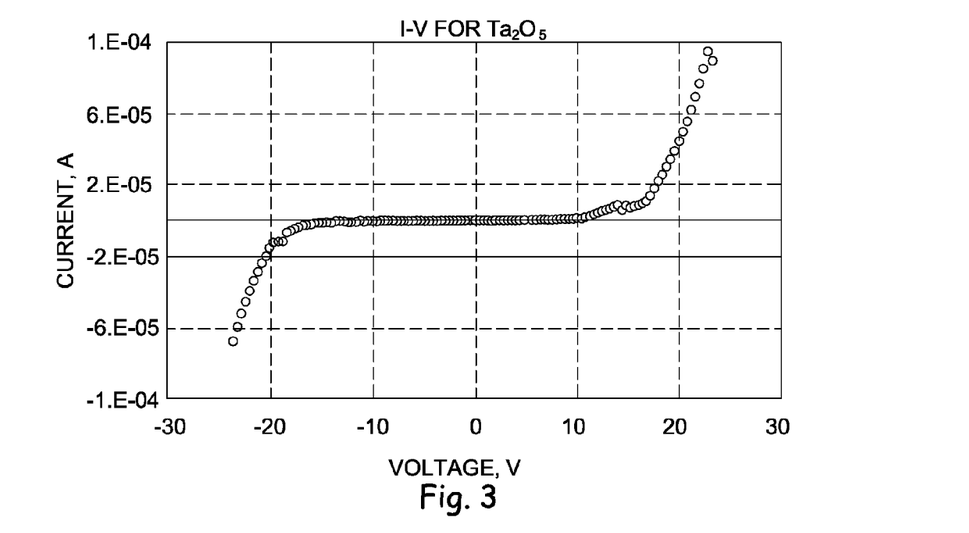
FIG. 3 is a graph illustrating the I-V characteristics of a $Ta_2O_5$ dielectric layer.

In the embodiment shown in FIGS. 2A and 2B, the display element 12 further includes a dielectric layer 22 established on the electrode 16. The dielectric layer 22 exhibits non-linear resistance behavior. It is believed that the dielectric layer 22 is capable of exhibiting such behavior with donors (i.e., Poole-Frenkel effect), with defects (i.e., abnormal Poole-Frenkel effect) and/or with tunneling (e.g., in the case of $SiN_x$). While all three mechanisms may contribute to the selective conductivity of the dielectric layer 22, it is believed that the main mechanism contributing to the non-linear resistance behavior of $Ta_2O_5$ is the Poole-Frenkel effect, and that the main mechanism contributing to the non-linear resistance behavior of $SiN_x$ is tunneling. Non-limiting examples of suitable dielectric materials that exhibit non-linear resistance include anodized $Ta_2O_5$, $SiN_x$ (i.e., amorphous silicon nitride prepared via plasma enhanced chemical vapor deposition (PECVD) or another similar technique, which may include up to 30% of hydrogen, and may be represented by a-$SiN_x$:H where x ranges from 1 (e.g., SiNH) to 1.3 (e.g., $Si_3N_4$)), or oxides prepared via the oxidation of tantalum or tantalum alloys (e.g., tantalum aluminum, tantalum niobium, tantalum tungsten, etc.), or combinations thereof. The non-linear resistance behavior of a $Ta_2O_5$ dielectric layer having a thickness of about 56 nm is illustrated in FIG. 3. As illustrated, the threshold voltage for this particular layer is about 17 V. Upon reaching and surpassing this threshold voltage, the current increases exponentially. As such, the addition of such a dielectric layer 22 to the display element 12 provides a selectively activated current barrier. The layer 22 acts as a current barrier when the electric potential applied to the element 12 is below the threshold voltage, and as a result, the optical state of the display element 12 will not change. However, when the electric potential applied to the element 12 is above the threshold voltage, the optical state of the display element 12 will change.

The threshold voltage value that is provided by the addition of the non-linear resistance dielectric layer 22 may vary depending, at least in part, upon the material used for the layer 22, the thickness of the layer 22, the deposition process used to establish the layer 22, and/or any post-processing techniques (e.g., annealing) that are performed on the layer 22. As mentioned hereinabove, the desired current density dictates the threshold voltage value. Therefore, the various factors listed herein may be altered in order to obtain a threshold voltage value that corresponds to the desired current density for the display element 12. Very generally, the thickness of the layer 22 ranges from about 10 nm to about 300 nm. In one non-limiting example, the thickness of the dielectric layer 22 ranges from about 15 nm to about 60 nm. The threshold voltage increases as the thickness increases. As a non-limiting example of this, when the thickness of a $Ta_2O_5$ dielectric layer is about 15 nm, the threshold voltage for a particular current density may be about 2 V, whereas when the thickness of the $Ta_2O_5$ dielectric layer is about 60 nm, the threshold voltage for the same current density may be about 20 V. It is to be understood that this particular example is provided for illustrative purposes, and that the threshold voltage may vary depending upon the desired requirements for the display element 12.

Generally, the dielectric layer 22 may be deposited via electrochemical oxidation, chemical vapor deposition (CVD), reactive magnetron sputtering, metal-organic chemical vapor deposition (MOCVD), or atomic layer deposition (ALD).

In the embodiment shown in FIGS. 2A and 2B, the display element 12 further includes another dielectric layer 24. This dielectric layer 24 is deposed between the electrodes 16, 18, and in this embodiment, is established on the dielectric layer 22. In an example, the dielectric layer 24 is selected from an optically transparent material, non-limiting examples of which include thermally and UV-curable, embossable resins, photoresists, inorganic dielectrics, and/or combinations thereof.

The dielectric layer 24 includes at least one reservoir 26 defined therein. In some instances, the dielectric layer 24 includes a single reservoir 26 in each display element 12. Such a configuration may be useful, for example, for display elements 12 that produce a single color. In other instances, more than one reservoir 26 may be defined in the dielectric layer 24 for each display element 12. Such configurations are schematically depicted in FIGS. 2A, 2B, 4, 5, 6A, 6B, and 7. Additional reservoirs 26 may be desirable, for example, to optimize the optical contrast of the images, increase a switching speed of the display 10 and/or to enable use of more than one type of colorant within each display element 12. The additional reservoirs 26 may, in an example, be formed in a periodic lattice arrangement or in an aperiodic stochastic arrangement. Periodic lattice arrangements typically have relatively uniform reservoir spacing, which tends to optimize switching uniformity. Aperiodic lattice arrangements, on the other hand, have random reservoir spacing, which tends to avoid interference patterns that may occur due, at least in part, to overlapping periodic lattices.

Figure 4:
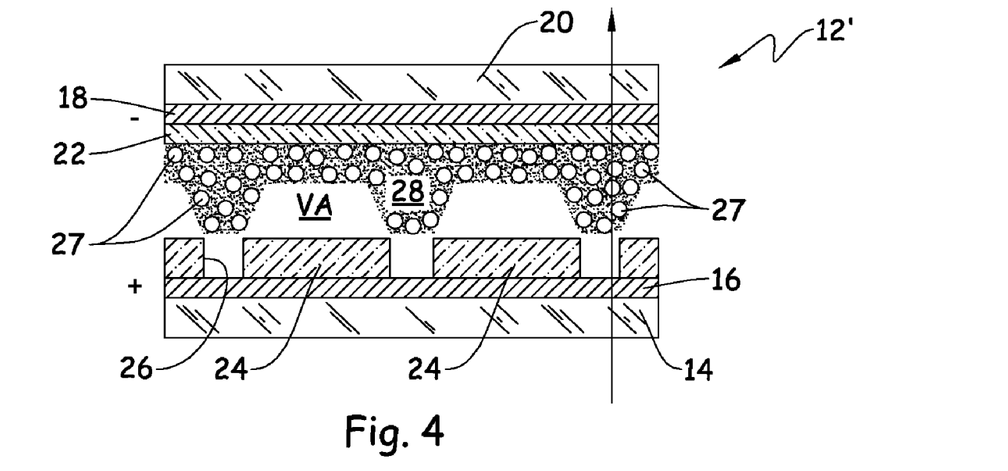
FIG. 4 is a cross-sectional view of an embodiment of a display element including a dielectric layer adjacent to a top electrode.

Furthermore, the reservoirs 26 may include line structures, dot structures, two-dimensional areas, three-dimensional shapes, fractal shapes, or combinations thereof. The reservoirs 26 may be formed into the dielectric layer 24 by patterning the dielectric layer 24 using embossing, photolithography, or some other suitable technique. It is to be understood that the reservoirs 26 may be patterned into the dielectric layer 24 to provide fluid communication between the viewing area VA of the display element 12 and the underlying layer (e.g., dielectric layer 22, or electrode 16 as shown in FIG. 4).

It is to be understood that the present embodiments are not to be limited in either shape or size of the reservoirs 26, as long as they satisfy the aperture, optical contrast and other operating requirements of the display element 12. The reservoirs 26 can be formed in circles, triangles, squares, rectangles, diamonds, stars, cones, inverse pyramids, or any other shape. Similarly, there is no requirement that all of the reservoirs 26 be the same size. As alluded to above, the reservoirs 26 can be sized such that size varies in either a periodic or an aperiodic stochastic fashion. The reservoirs 26 can also be randomly sized in a single segment or pixel.

Dot structures that are small compared to the area of the display element 12 can be considered zero dimensional shapes. Line structures that have one dimension substantially larger than the other can be considered one dimensional shapes. Reservoirs 26 with a cross-sectional area that is significant compared to the area of the display element 12 can be considered two dimensional areas. Reservoirs 26 with non-vertical walls as well as features with protrusions into the viewing area VA can be considered three dimensional shapes.

The reservoir 26 shape and arrangement affects, for example, the clear aperture not taken up by the reservoirs 26. Higher clear apertures result in a brighter (e.g., if a reflector is present) or more transparent display in the clear state.

In a non-limiting example, the reservoir(s) 26 has/have a predetermined depth that extends through a thickness T of the dielectric layer 24 and provides a volume of free space inside the display element 12 for collecting charged colorants (shown as reference numeral 27, which are present in electrically actuatable medium 28) during one or more stages of an addressing sequence for the display 10.

In order to maximize the optical contrast between a clear or transparent state (see, e.g., FIG. 2B, where the colorants 27 are compacted inside the reservoir(s) 26) of the display element 12 and a dark, colored, or opaque state (see, e.g., FIG. 2A, where the colorants are 27 spread across the viewing area VA) of the display element 12, the total area of the reservoir(s) 26 is also substantially less than a total area of the display element 12. The area of the reservoir(s) 26 generally affects a brightness capability of the display 10, 10' in the clear state since the compacted colorants 27 absorb light therein. In one embodiment, the total area of the reservoir(s) 26 is less than about 50% of the total area of the display element 12. In another embodiment, the total area of the reservoir(s) 26 is less than about 30% of the total area of the display element 12. In still another embodiment, the total area of the reservoir(s) 26 is less than about 20% of the total area of the display element 12. In an even further embodiment, the total area of the reservoir(s) 26 is less than about 10% of the total area of the display element 12. In yet another embodiment, the total area of the reservoir(s) 26 ranges from about 1% to about 10% of the total area of the display element 12.

It is to be understood that the dielectric layer 24 may also be patterned with multiple dimensional shapes or fractal shapes. This patterning includes patterning the dielectric layer 24 to include walls (not shown) that together with the electrodes 16, 18 define the viewing area VA.

The display element 12 includes an electrically activatable medium 28 disposed in the viewing area(s) VA, which is in fluid communication with the reservoirs 30. As used herein, an "electrically activatable medium" refers to a carrier fluid that fills up the entire viewing area VA and the reservoirs 26. The electrically activatable medium 28 includes a plurality of colorant 27 dispersed therein. In response to a sufficient electric potential or field, the colorants 27 move and/or rotate to various spots within the viewing area VA, the reservoir 28, or both in order to produce desired visible images during one or more stages of an addressing sequence. Non-limiting examples of electrically activatable mediums 28 include electrophoretic mediums, electronic inks or fluids, anisotropic mediums such as liquid crystals, and/or the like. The electrically activatable medium 28 may be transparent, colored, or dyed.

The colorants 27 dispersed in the medium 28 may, in an embodiment, include a single type of particle (such as, e.g., the same color, the same charge, etc.) or, in another embodiment, include two or more types of particles (such as, e.g., two or more different colors, different charges, etc.). In one embodiment, the colorants 27 may include a mixture of two different types of colorant particles. In this example, the first type of colorant particles displays a first color, while a second type of colorant particles displays a second color. The mixture of the different types of colorants 27 may also be included in a transparent medium, a colored medium, or a dyed medium. The colorants 27 may be pigment particles or nanoparticle pigment dispersions, a combination of pigment particles and a dye, polymer or inorganic particles colored with dye molecules or pigments, or the like.

Once the electrically activatable medium 28 is disposed in the viewing area(s) VA, the structure of the display element 12 is completed by establishing the other electrode 18 thereon.

In the embodiments shown in FIGS. 2A and 2B, the colorant particles 27 in the medium can be controlled by applying attractive or repulsive bias conditions to the electrode 16. The electrode 18 assists in controlling the colorant 27 distribution. FIG. 2A illustrates an embodiment of the display element 12 when the electric potential applied to the electrodes 16, 18 is zero or is below the threshold voltage value imparted to the element 12 by the dielectric layer 22. This state of the display element 12 is the dark state or non-clear optical state. In this dark state, the colorant particles 27 in the medium 28 relatively uniformly distribute across the viewing area VA. However, when the electric potential applied is above the threshold voltage value imparted to the element 12 by the dielectric layer 22, the current flows through the display element 12 and the colorant particles 27 are attracted to the electrode 16 and into the reservoirs 26. In passive addressing, it is to be understood that select lines SL (e.g., electrode 16) may be maintained below the threshold voltage while the data lines DL (e.g., electrode 18) provide additional voltage to overcome the threshold value. In active addressing, it is to be understood that the common electrode (e.g., electrode 18) may be maintained below the threshold voltage while the selected pixel electrodes (e.g., electrode 16) provide additional voltage to overcome the threshold value. As mentioned above, for active addressing, individual transistors t (shown in FIG. 1B) may be used to turn on the bias. Regardless of the type of addressing that is used, this state of the display element 12 is the clear optical state (see FIG. 2B).

Figure 5:
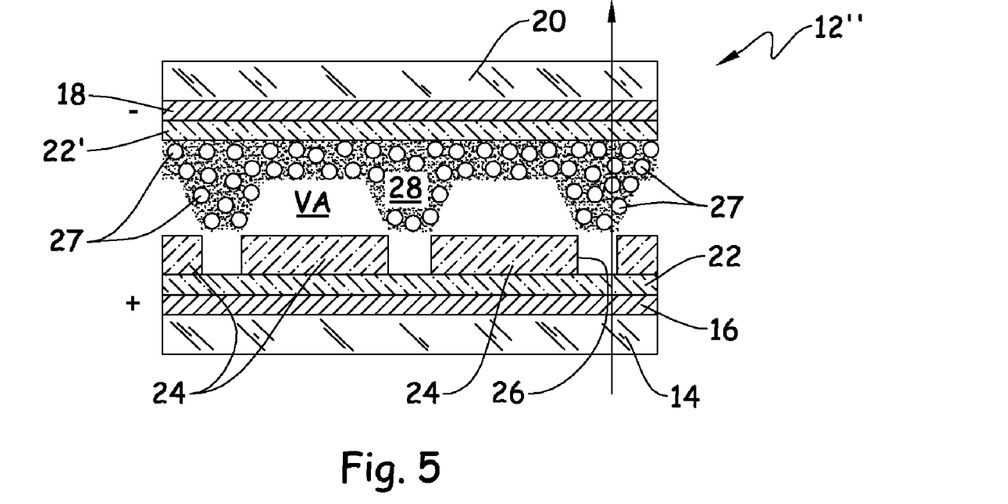
FIG. 5 is a cross-sectional view of an embodiment of a display element including respective dielectric layers adjacent to a top electrode and a bottom electrode.

FIGS. 4 and 5 illustrate other embodiments of the display element 12', 12", respectively, which include the dielectric layer 22 exhibiting non-linear resistance. In FIG. 4, the display element 12" includes the dielectric layer 22 established adjacent the electrode 18 (as opposed to the electrode 16 as shown in FIGS. 2A and 2B). In FIG. 5, the display element 12" includes two dielectric layers 22, 22' exhibiting non-linear resistance, one 22 of which is disposed between the electrode 16 and the patterned dielectric layer 24 and the other 22' of which is disposed adjacent to the electrode 18. It is to be understood that these configurations of the dielectric layer 22, 22' also function as a barrier for current flow when the voltage applied is zero or below the particular threshold value of the display element 12', 12". FIGS. 4 and 5 both illustrate an example of the approximate colorant 27 distribution when a reverse bias (i.e., a bias that has the effect of spreading the colorants 27 out of the reservoirs 26 as opposed to the effect of compacting the colorants 27 into the reservoirs 26) is applied between the electrodes 16, 18.

Figure 6A:
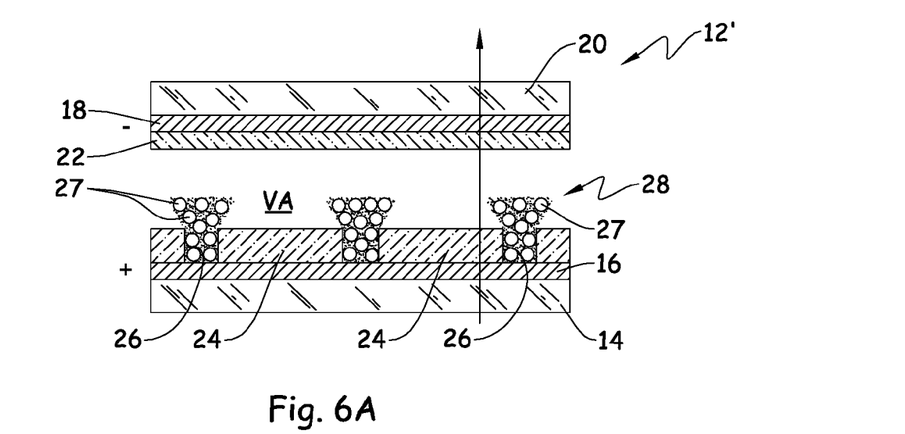
FIGS. 6A and 6B are cross-sectional views of an embodiment of a display element illustrating the grey scale level controlled such that the optical state is a light grey level (FIG. 6A) and a dark grey level (FIG. 6B)
Figure 6B:
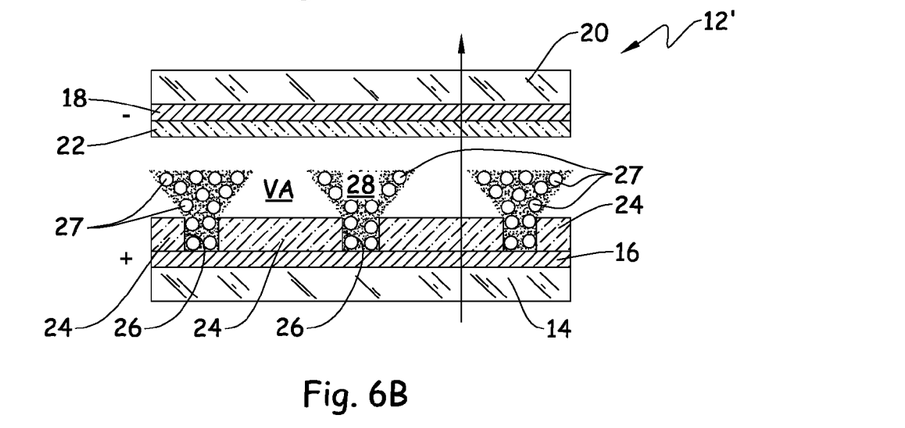

It is to be understood that the display elements 12, 12', 12" disclosed herein may be controlled so that various grey scale levels may be achieved. Two non-limiting examples of such grey states in the display element 12' are depicted in FIGS. 6A and 6B. A lighter grey scale level is shown in FIG. 6A and a darker grey scale level is shown in FIG. 6B.

Desirable grey scale levels may be achieved by increasing the applied electric potential such that the threshold is exceeded. The electrokinetic flow at such electric potentials enables the colorant particles 27 to compact. The pulse intensity or voltage determines the time it takes to compact all of the colorant particles 27 (i.e., the switching time). While the electric potential is above the threshold value, the amplitude and/or pulse width (i.e., shorter than the switching time) of the voltage may be modulated to control the degree of compaction and thus the grey scale level achieved. Such modulation enables one operating the display element 12' to dynamically control and directly transition between grey scale levels.

The charged colorants 27 compact while the voltage is maintained above the threshold. Adjusting the applied voltage down to a holding voltage (which is below the threshold value) results in no current flowing and the application of electrophoretic force alone on the charged particles, and thus partially compacted states of the colorants 27 can be maintained. As such, once the colorants 27 are compacted to a desirable level, the applied potential may be decreased down to the holding voltage, which will retain the colorants 27 in their then-current positions (e.g., in the reservoirs 26), and thus will maintain the display element 12' in its then-current state.

In one embodiment, the above-threshold voltage is applied and the amplitude of this voltage is dynamically modulated to achieve a dynamic equilibrium between the compacted and spread state of the colorants 27 at certain grey level. Once the desired grey level is obtained, the applied voltage is brought down to a holding voltage (i.e., below the threshold voltage value) to maintain that state. In this embodiment, a direct transition from one grey level to another grey level may be obtained while the voltage is dynamically modulated above the threshold value. Once the display element 12 is held at the lower bias, the voltage needs to be brought back up above the threshold level to again modulate to another grey level. Once this other gray level is achieved, the applied voltage may then be dropped down below the threshold value to hold this other gray level. This embodiment allows for the direct transition between any two grey scale levels (e.g., 25% to 50%, or 50% to 25%) without going through an intermediate reset step at every image change. It is believed that this will improve the appearance of dynamic images, such as interactive information or animations.

In another embodiment, a constant above-threshold voltage is applied for a time period (i.e., pulse width) shorter than switching time. As some non-limiting examples, the pulse widths may vary from 10 ms to 100 ms, to 200 ms, to 300 ms, to 500 ms, to 800 ms, to 1200 ms. In this embodiment, controlling how long the above-threshold voltage is applied will control the amount of particles 27 that compact to achieve the desired grey scale. Once the desired gray level is achieved, the applied voltage is decreased to a holding voltage to maintain that state. In this embodiment, the colorants 27 are spread out to the dark state before the pulse width control method may be used to provide another grey level.

The particles of the medium 28 of the display element 12' shown in FIG. 6A are compacted for a longer pulse width than the particles of the medium 28 of the display element 12' shown in FIG. 6B. As a result, a lighter grey scale level is achieved in the element 12' shown in FIG. 6A because the particles are more compacted into the reservoirs 26 than in the element 12' shown in FIG. 6B.

Figure 7:
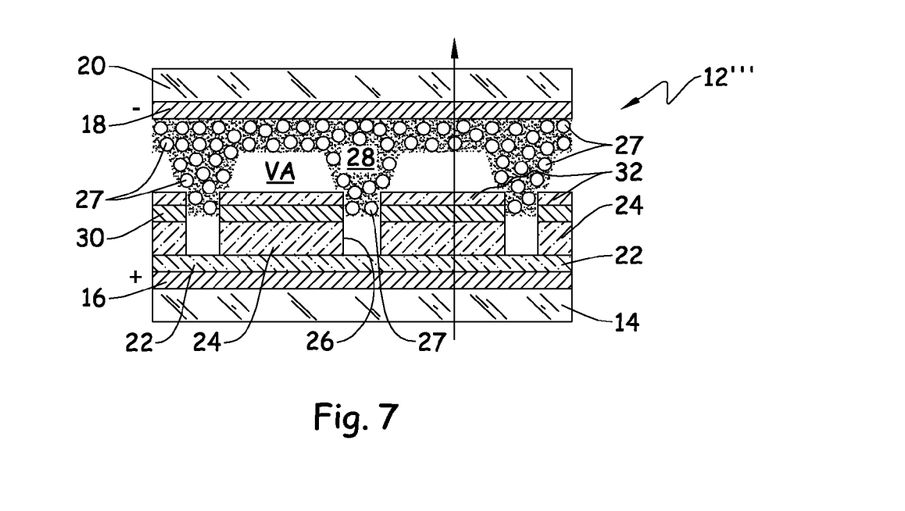
FIG. 7 is a cross-sectional view of an embodiment of a display element including a dielectric layer adjacent to a bottom electrode and including a gate electrode.

Referring now to FIG. 7, still another embodiment of the display element 12''' is depicted. In this embodiment, the threshold voltage value introduced by the dielectric layer 22 is used in conjunction with a gate electrode 30. The gate electrode 30 may provide the display element 12''' with enhanced holding capability.

As illustrated in FIG. 7, the gate electrode 30 is selectively deposited on the patterned dielectric layer 24. The gate electrode 30 may be formed of any of the materials set forth herein for the electrodes 16, 18, and the gate electrode 30 may be formed via any suitable deposition technique followed by patterning, which may include etching and/or electroplating processes. A non-limiting example of forming a gate electrode 30 is described in International Patent Application Number PCT/US09/42402, filed on Apr. 30, 2009, entitled "A Display", the contents of which is incorporated herein in its entirety.

The display element 12''' may include a passivation layer 32 disposed at least on the gate electrode 30. In an embodiment, the passivation layer 32 is formed from a dielectric material. Non-limiting examples of such materials include photo-activated resins (e.g., SU8), photoresists, dielectric oxides (e.g., $SiO_2$, $HfO_2$, etc.), non-conductive polymers, and/or the like, and/or combinations thereof.

It is to be understood that in this embodiment of the display element 12''', the grey scale level is controlled by the data line voltages (e.g., electrode 16 or 18), whereas the holding potential is provided by the gate electrode 30. It is believed that by separating these functions, display 10, 10' operation will be stable and predictable, and grey scale level will be more readily controllable.

Embodiments of the display element 12, 12', 12'', 12''' disclosed herein further include electrical contacts configured to apply an appropriate electric potential to at least one of the electrodes 16, 18, or the gate electrode 30 when driving the display 10 to produce a visual image. In an example, the electrical contacts may be situated along a side of the display 10, 10', where the electric potential or field is applied to one of the electrodes 16, 18, or the gate electrode 30 from a side of each display element 12, 12', 12'', 12'''. In another example, electrical connection of at least one of the electrodes 16, 18, 30 may be accomplished using a backplane. The backplane may, for example, include the electrodes configured to drive the display 10, 10' and suitable hardware configured to drive the electrodes. For example, the gate electrode 30 may be along the select lines SL and one of the electrodes 16, 18 may be considered parts of the backplane. In some instances, the backplane includes additional elements such as power supply lines and the like.

It is to be understood that the present disclosure includes circuitry suitable for driving the display 10, 10'. It is to be understood that this circuitry (non-limiting examples of which are shown in FIGS. 1A and 1B) may include, but is not limited to software, hardware, firmware, and/or the like, and/or combinations thereof.

While several embodiments have been described in detail, it will be apparent to those skilled in the art that the disclosed embodiments may be modified. Therefore, the foregoing description is to be considered exemplary rather than limiting.

What is claimed is:

1. An electrokinetic display, comprising:
a plurality of display elements, each of which includes:
two opposed electrodes;
a first dielectric layer disposed between the electrodes, the first dielectric layer having at least one reservoir defined therein;
a charge transfer fluid including a plurality of colorants disposed in a space defined between the electrodes, the plurality of colorants being configured to move in response to an applied electric field and in response to current flowing through the fluid; and
a second dielectric layer disposed on at least one of the electrodes and adjacent to the fluid, the second dielectric layer exhibiting non-linear resistance;
the reservoir being defined through a thickness of the first dielectric layer so that a component directly adjacent to the first dielectric layer is exposed and is in selective electrical contact with the fluid, the component being any of the two opposed electrodes, or the second dielectric layer.

2. The electrokinetic display as defined in claim 1 wherein the non-linear resistance provides a threshold voltage for the display element.

3. The electrokinetic display as defined in claim 2 wherein the threshold voltage is dependent on at least a thickness of the second dielectric layer, and wherein when the thickness of the second dielectric layer ranges from about 10 nm to about 300 nm.

4. The electrokinetic display as defined in claim 2 wherein the second dielectric layer is configured to selectively produce a barrier for current flow to one or more display elements when a voltage applied to the one or more display elements is below the threshold voltage, whereby a then-current optical state of the one or more display elements remains unchanged.

5. The electrokinetic display as defined in claim 1 wherein the second dielectric layer is formed from anodized $Ta_2O_5$, $SiN_x$, tantalum aluminum oxides, niobium aluminum oxides, or combinations thereof.

6. The electrokinetic display as defined in claim 1, further comprising two opposed substrates, wherein a first of the two opposed substrates has a first of the two opposed electrodes disposed thereon and a second of the two opposed substrates has a second of the two opposed electrodes disposed thereon, wherein the second dielectric layer is disposed on the second electrode, and the first dielectric layer is disposed on the second dielectric layer.

7. The electrokinetic display as defined in claim 1, further comprising two opposed substrates, wherein a first of the two opposed substrates has a first of the two opposed electrodes disposed thereon and a second of the two opposed substrates has a second of the two opposed electrodes disposed thereon, wherein the second dielectric layer is disposed on the first electrode.

8. The electrokinetic display as defined in claim 1, further comprising:
   two opposed substrates, wherein a first of the two opposed substrates has a first of the two opposed electrodes disposed thereon and a second of the two opposed substrates has a second of the two opposed electrodes disposed thereon; and
   a third dielectric layer disposed on the first electrode, the third dielectric layer exhibiting non-linear resistance;
   wherein the second dielectric layer is disposed on the second electrode.

9. The electrokinetic display as defined in claim 1 wherein each of the electrodes is selected from a pixel-size conductive plate, a line electrode, and a segment electrode.

10. The electrokinetic display as defined in claim 1, further comprising:
    a gate electrode disposed on at least a portion of the first dielectric layer; and
    a third dielectric layer disposed on the gate electrode;
    wherein the gate electrode is configured to control a grey scale level exhibited by the electrokinetic display.

11. The electrokinetic display as defined in claim 1 wherein the electrokinetic display is configured to be driven via direct drive, passive matrix addressing, or active matrix addressing.

12. Circuitry for driving an electrokinetic display element, the circuitry configured to perform the following steps:
    applying an electric potential to each of two opposed electrodes of the electrokinetic display element for a predetermined amount of time, the electrokinetic display element further including:
       a first dielectric layer disposed between the electrodes, the first dielectric layer having at least one reservoir defined therein;
       a charge transfer fluid including a plurality of colorants disposed in a space defined between the electrodes, the plurality of colorants being configured to move in response to an applied electric field and in response to current flow through the fluid; and
       an additional dielectric layer disposed on at least one of the electrodes and adjacent to the fluid, the additional dielectric layer exhibiting non-linear resistance;
       the reservoir being defined through a thickness of the first dielectric layer so that a component directly adjacent to the first dielectric layer is exposed and is in selective electrical contact with the fluid, the component being any of the two opposed electrodes, or the second dielectric layer; and
    compacting at least a portion of the colorants into the at least one reservoir defined in the first dielectric layer when the electric potential applied to one of the electrodes exceeds a threshold voltage provided by the non-linear resistance of the additional dielectric layer and current is driven through the fluid.

13. The circuitry as defined in claim 12, further configured to achieve a clear optical state of the electrokinetic display element when the electric potential applied to one of the electrodes is maintained above the threshold value.

14. The circuitry as defined in claim 12, further configured to reduce the electric potential applied to the one of the electrodes to a holding potential, wherein upon reaching the holding potential, the at least some of the colorants are retained in the at least one reservoir.

15. The circuitry as defined in claim 12, further configured to perform the following steps:
    modulating at least one of an amplitude or a pulse width of the applied electric potential while the applied electric potential exceeds the threshold voltage to control the compacting of the colorants in the at least one reservoir; and
    reducing the applied electric potential to a holding potential that is below the threshold voltage, thereby enabling the electrokinetic display element to achieve an optical state in a grey scale.

16. The circuitry as defined in claim 15 wherein the modulating is achieved via the one of the electrodes, and wherein the holding potential is achieved via a gate electrode disposed on at least a portion of the first dielectric layer.

17. The circuitry as defined in claim 12, further configured to retain the colorants in the space defined between the electrodes when the electric potential falls below the threshold voltage, the retaining enabling the electrokinetic display element to achieve a non-clear optical state.

18. An electrokinetic display element, comprising:
    two opposed electrodes;
    a first dielectric layer disposed between the electrodes, the first dielectric layer having at least one reservoir defined therein;
    a charge transfer fluid including a plurality of colorants disposed in a space defined between the electrodes, the plurality of colorants being configured to move in response to an applied electric field and in response to current flow through the fluid; and
    a second dielectric layer disposed on at least one of the electrodes and adjacent to the fluid, the second dielectric layer exhibiting non-linear resistance that provides a threshold voltage for the electrokinetic display element;
    the reservoir being defined through a thickness of the first dielectric layer so that a component directly adjacent to the first dielectric layer is exposed and is in selective electrical contact with the fluid, the component being any of the two opposed electrodes, or the second dielectric layer.

19. The electrokinetic display element as defined in claim 18, further comprising two opposed substrates, wherein a first of the two opposed substrates has a first of the two opposed electrodes disposed thereon and a second of the two opposed substrates has a second of the two opposed electrodes disposed thereon, and wherein one of:
    the second dielectric layer is disposed on the second electrode, and the first dielectric layer is disposed on the second dielectric layer;
    the second dielectric layer is disposed on the first electrode; or
    the second dielectric layer is disposed on the second electrode and a third dielectric layer is disposed on the first electrode, the third dielectric layer exhibiting non-linear resistance.

20. The electrokinetic display element as defined in claim 18, further comprising:
    a gate electrode disposed on at least a portion of the first dielectric layer; and
    a third dielectric layer disposed on the gate electrode;
    wherein the gate electrode is configured to control a grey scale level exhibited by the electrokinetic display element.

21. The electrokinetic display as defined in claim 1 wherein a total area of the reservoir is less than about 50% of a total area of the display element.

* * * * *